Sept. 23, 1958 H. T. HAYES 2,853,703
FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES
Filed Sept. 21, 1951 8 Sheets-Sheet 1

INVENTOR
HARRY T. HAYES
BY Lyon & Lyon
ATTORNEYS

Sept. 23, 1958 H. T. HAYES 2,853,703

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Filed Sept. 21, 1951 8 Sheets-Sheet 2

INVENTOR
HARRY T. HAYES
BY Lyon & Lyon
ATTORNEYS

Sept. 23, 1958 H. T. HAYES 2,853,703

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Filed Sept. 21, 1951 8 Sheets-Sheet 3

INVENTOR.
HARRY T. HAYES
BY Lyon & Lyon
ATTORNEYS

Sept. 23, 1958 H. T. HAYES 2,853,703

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Filed Sept. 21, 1951 8 Sheets-Sheet 4

INVENTOR
HARRY T. HAYES
BY Lyon & Lyon
ATTORNEYS

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Filed Sept. 21, 1951

INVENTOR
HARRY T. HAYES
BY Lyon & Lyon
ATTORNEYS

Sept. 23, 1958 H. T. HAYES 2,853,703

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Filed Sept. 21, 1951 8 Sheets-Sheet 6

INVENTOR
HARRY T. HAYES
BY Lyon & Lyon
ATTORNEYS

Sept. 23, 1958 H. T. HAYES 2,853,703

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Filed Sept. 21, 1951

8 Sheets-Sheet 7

INVENTOR
HARRY T. HAYES
BY Lyon & Lyon
ATTORNEYS

Sept. 23, 1958 H. T. HAYES 2,853,703

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Filed Sept. 21, 1951 8 Sheets-Sheet 8

INVENTOR
HARRY T. HAYES
BY Lyon & Lyon
ATTORNEYS

United States Patent Office 2,853,703

Patented Sept. 23, 1958

2,853,703

FORMATION AND USE OF A VIDEO TRAIN INCLUDING ECHO SIGNALS, AMPLITUDE MODULATED RANGE MARKS, AND CURSOR PULSES, ALL BRACKETED BY TIME-SPACED CONTROL PULSES

Harry T. Hayes, Long Beach, Calif., assignor to Gilfillan Bros., Inc., Los Angeles, Calif., a corporation of California Application September 21, 1951, Serial No. 247,738

11 Claims. (Cl. 343—11)

The present invention relates to improved techniques and means, particularly useful in cathode ray tube indicators of the type such as found in the so-called precision section of G. C. A. (ground control approach) radar aircraft landing systems, but is of course not necessarily limited to use in such equipment. In general the present application is directed to specific features of the system described and claimed in my co-pending application in which I am listed with Landee, et al., as one of the joint inventors, such co-pending application having Serial No. 247,616, filed on even date herewith, and assigned to the present assignee and having matured as Patent No. 2,796,603 on June 18, 1957.

In general, the present invention relates to apparatus and techniques for mixing or placing various components on the composite video train used in the system described in the aforementioned co-pending application; more specifically, the present invention relates to improved techniques and apparatus for mixing various components on a composite video train with such composite video train including a pair of time spaced so-called C and L triggers, between which is bracketed various voltages for producing visible indications on the face of a cathode ray tube.

Further objects of the present invention may be ascertained from the following description herein and the description in the aforementioned copending patent application, which is incorporated herein by this reference thereto.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
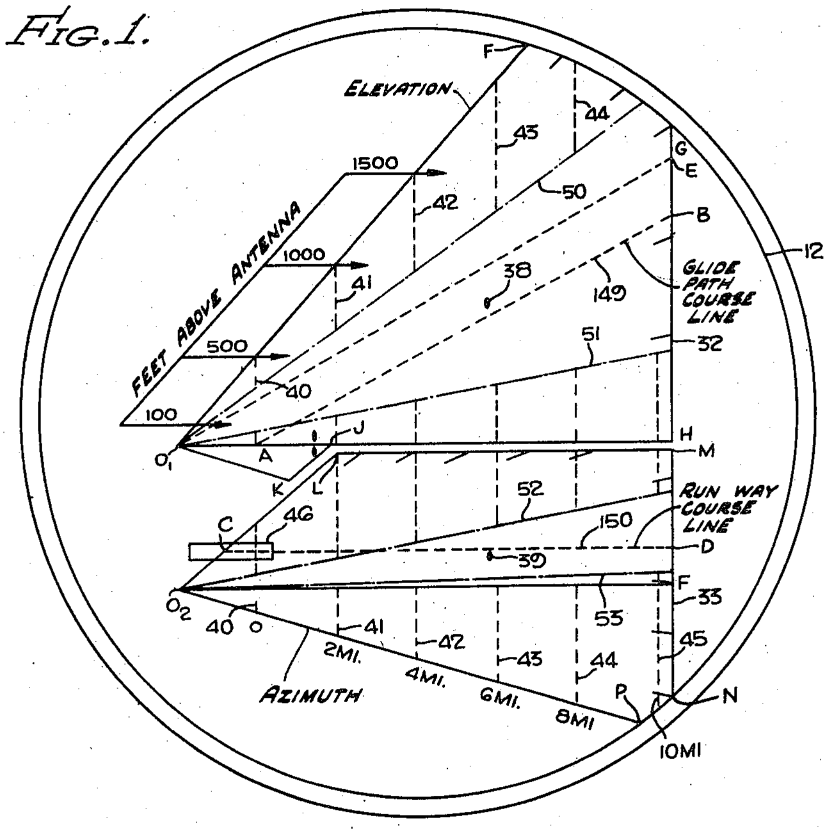
Figure 1 shows both an azimuth versus range and an elevation versus range, i. e., a so-called Az-El display on the viewing surface of a cathode ray tube, the range marks, spaced at equal time intervals, being intensity modulated in accordance with features of the present invention for conveying V-follower information.
Figure 15:
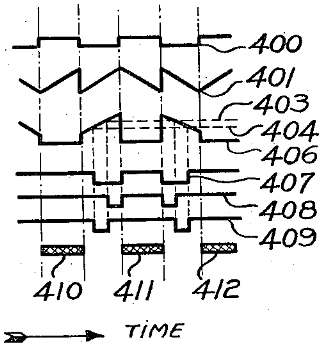
Figure 9:
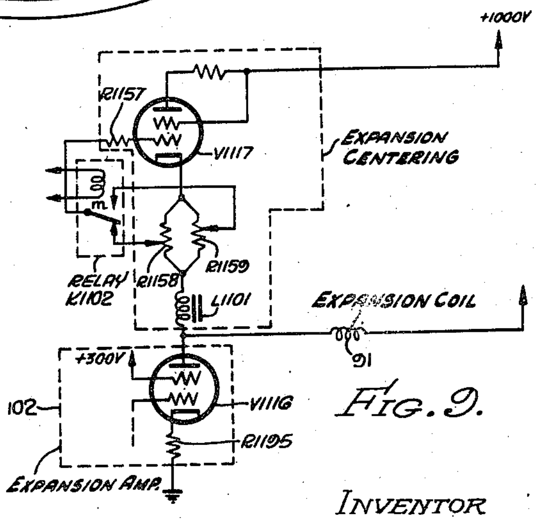
Figures 2, 5, 6, 13:
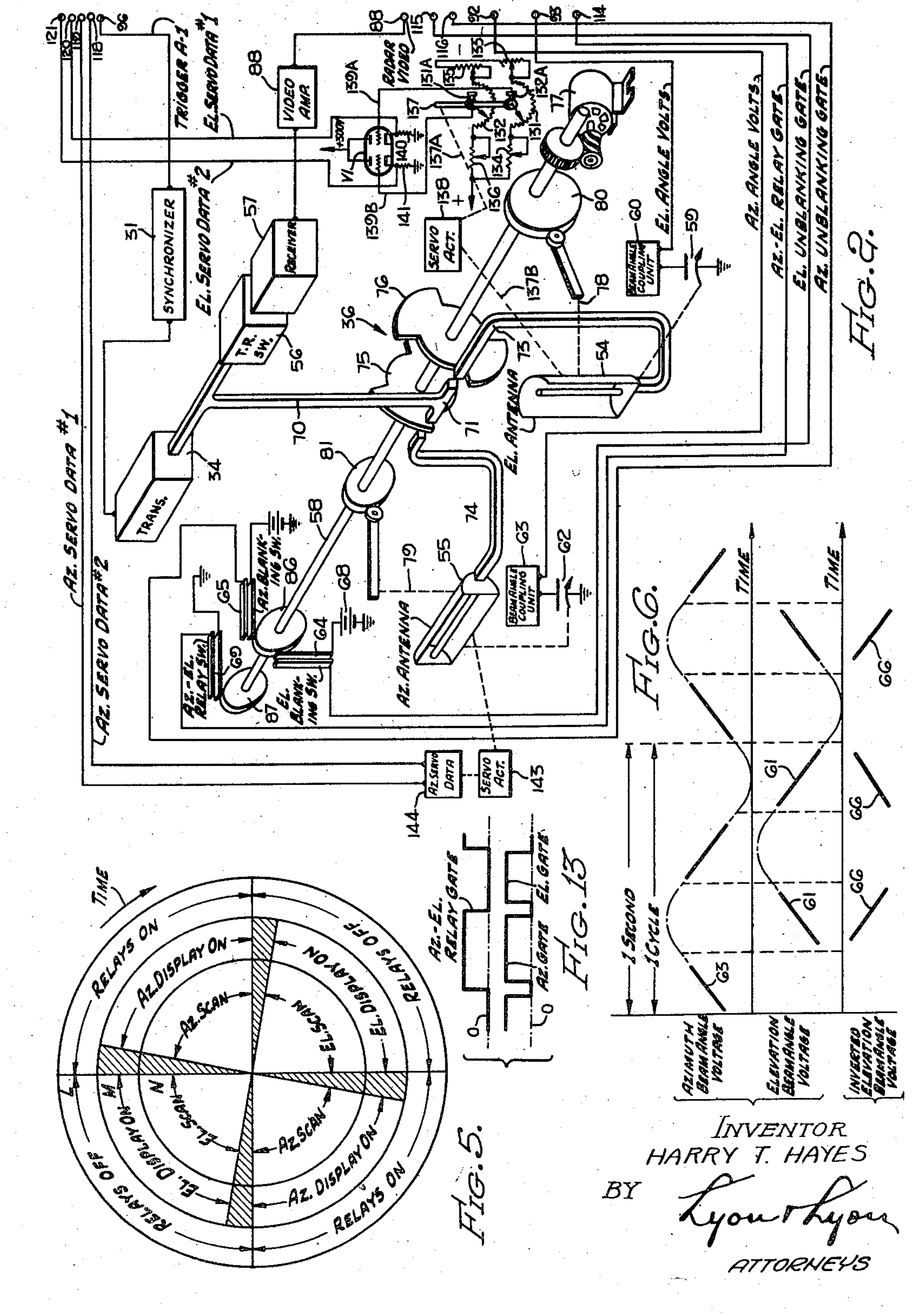
Figure 2 shows in schematic form antenna beam scanning apparatus and related switches and other apparatus controlled thereby.
Figure 3:
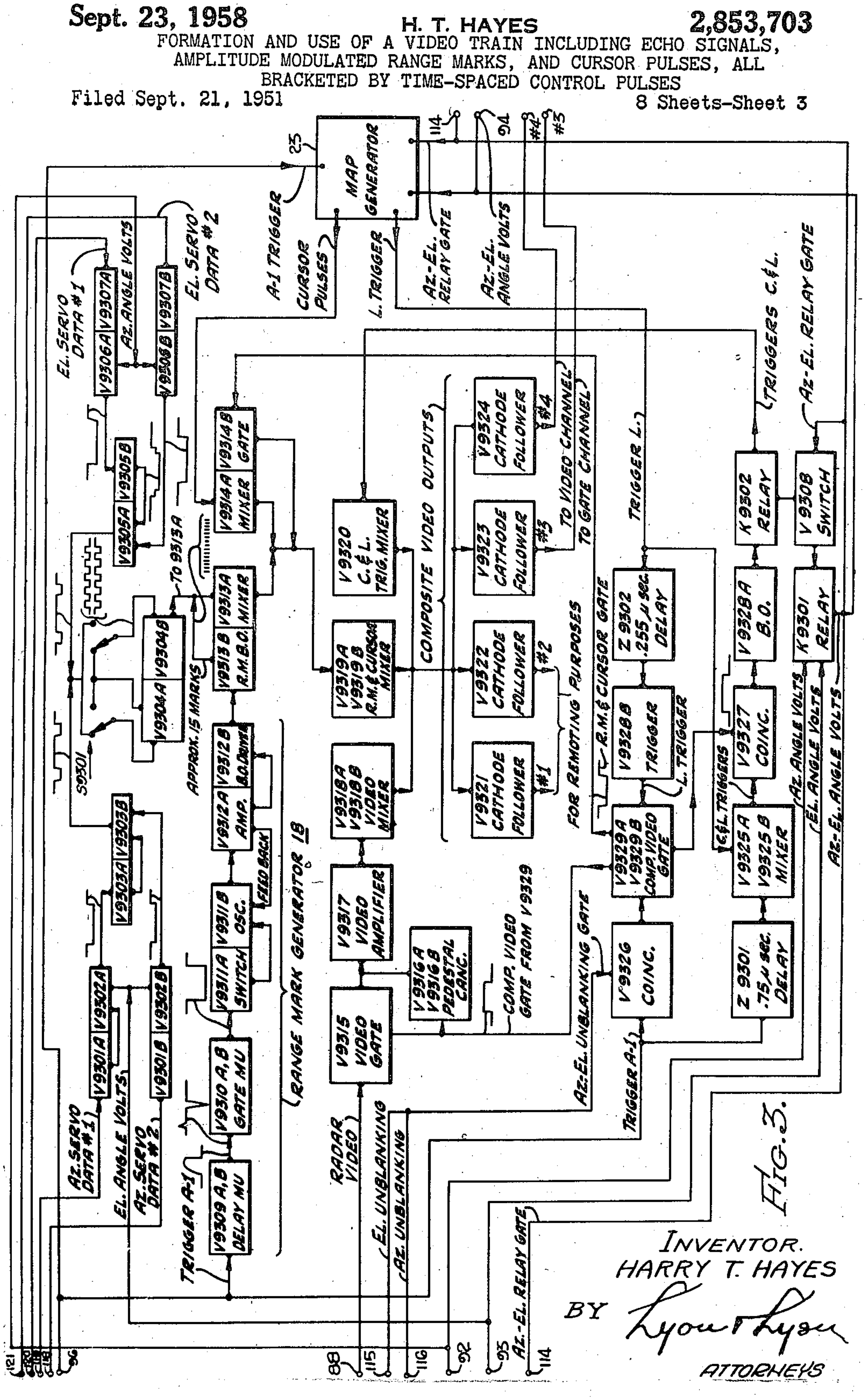
Figure 3 is a block diagram of apparatus intended to be connected to correspondingly designated terminals in Figure 1.
Figure 4:
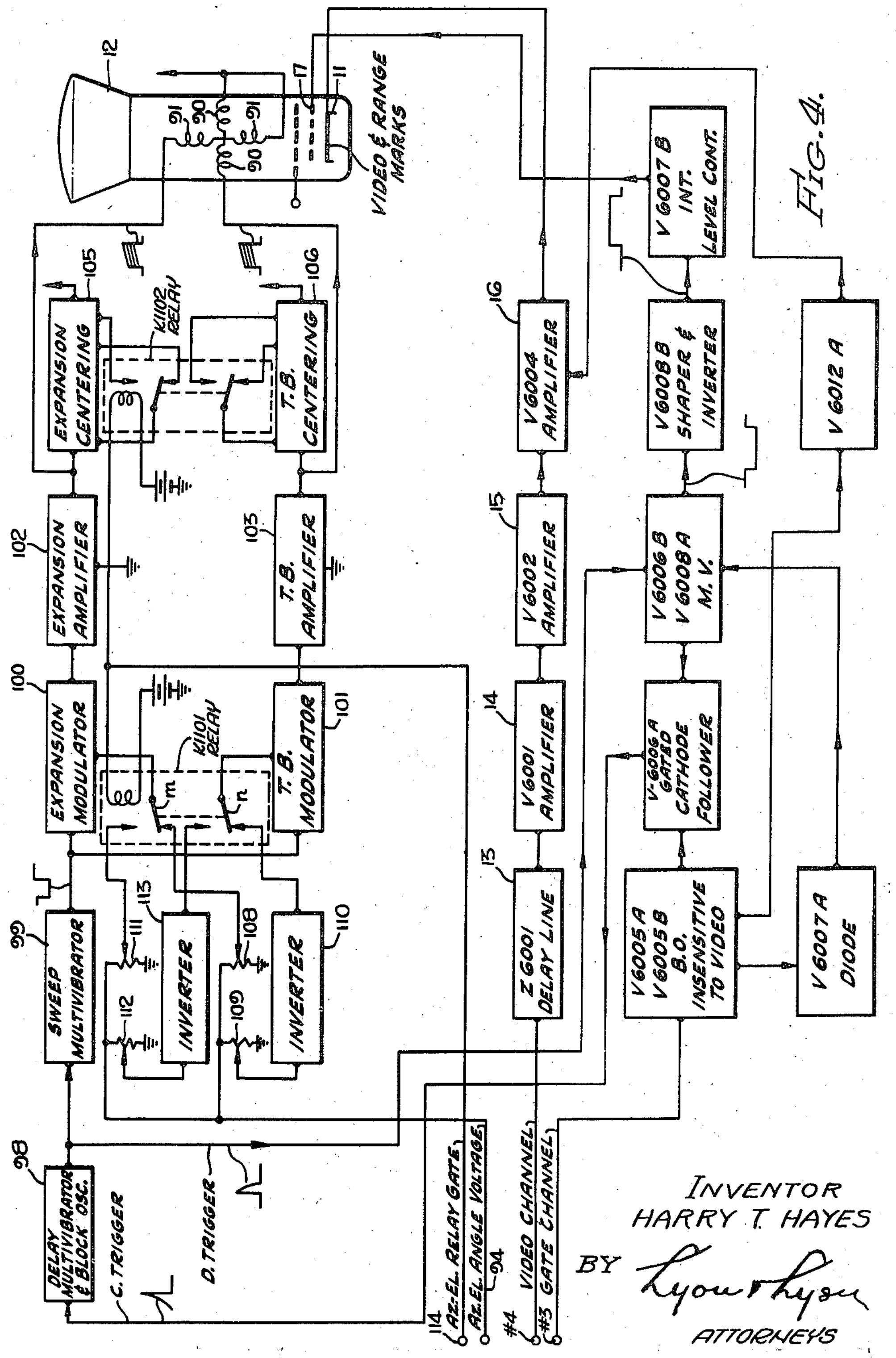
Figure 4 shows in block diagram form certain apparatus connected to correspondingly designated terminals in Figure 3.
Figure 7:
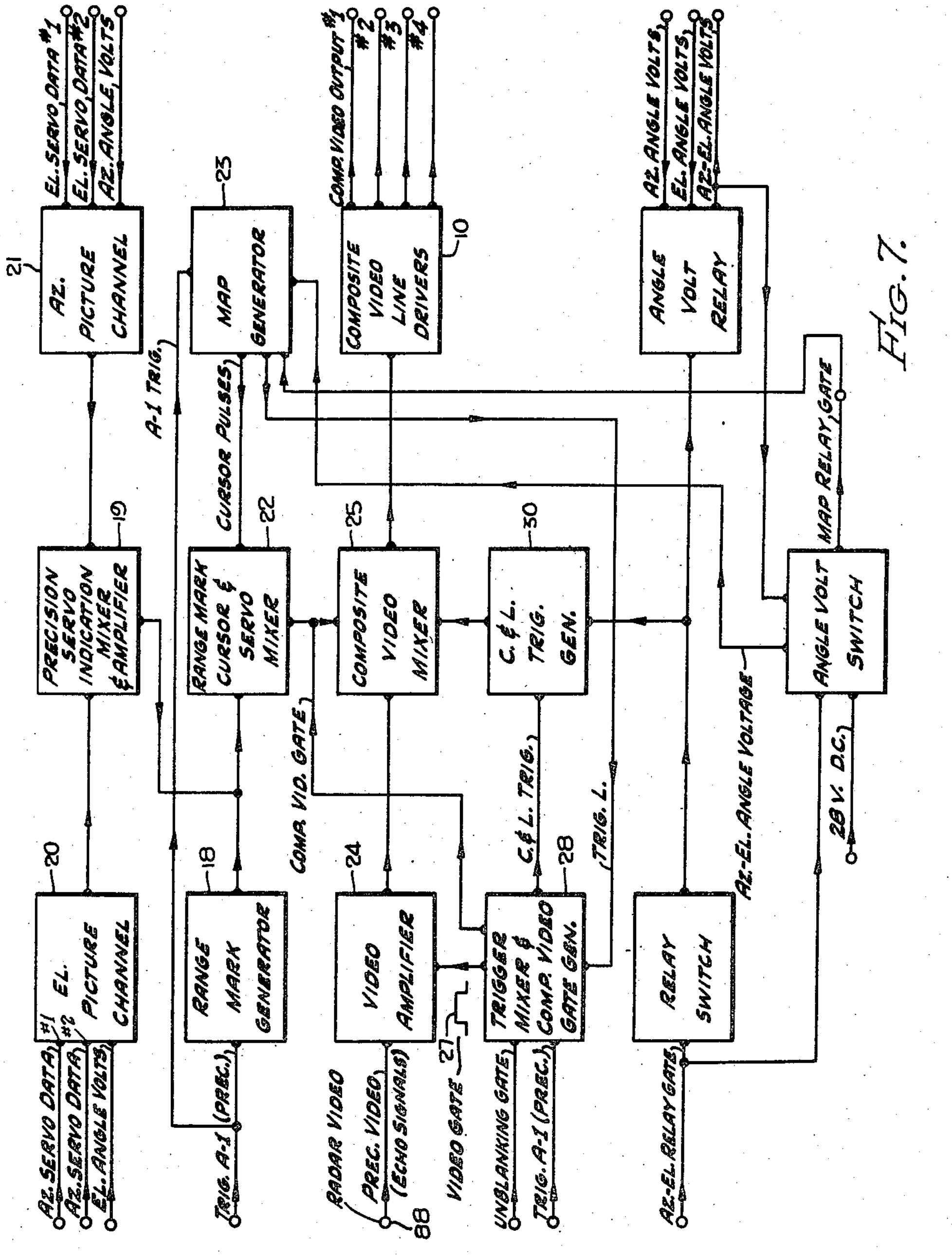
Figure 8:
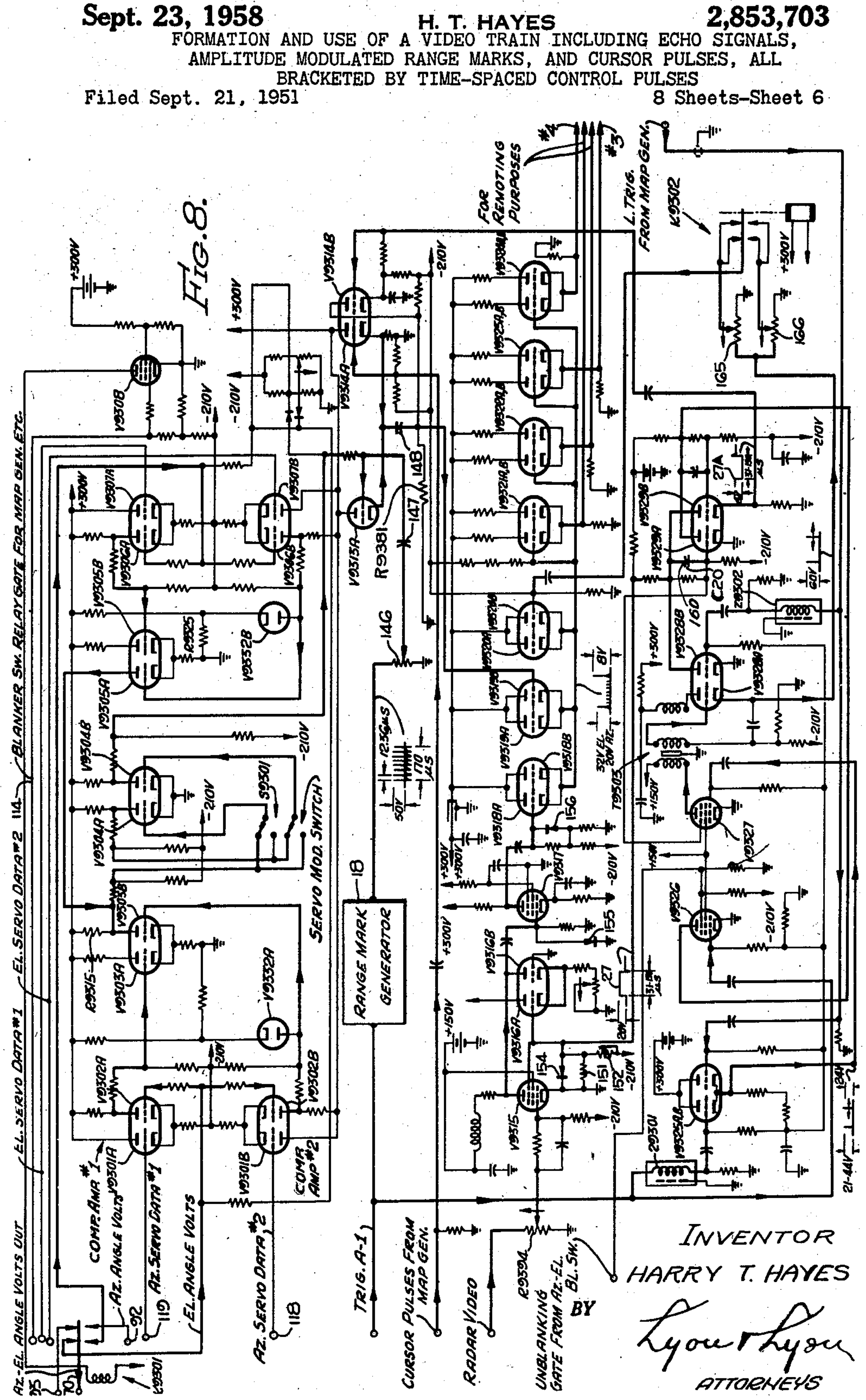
Figures 10, 14:
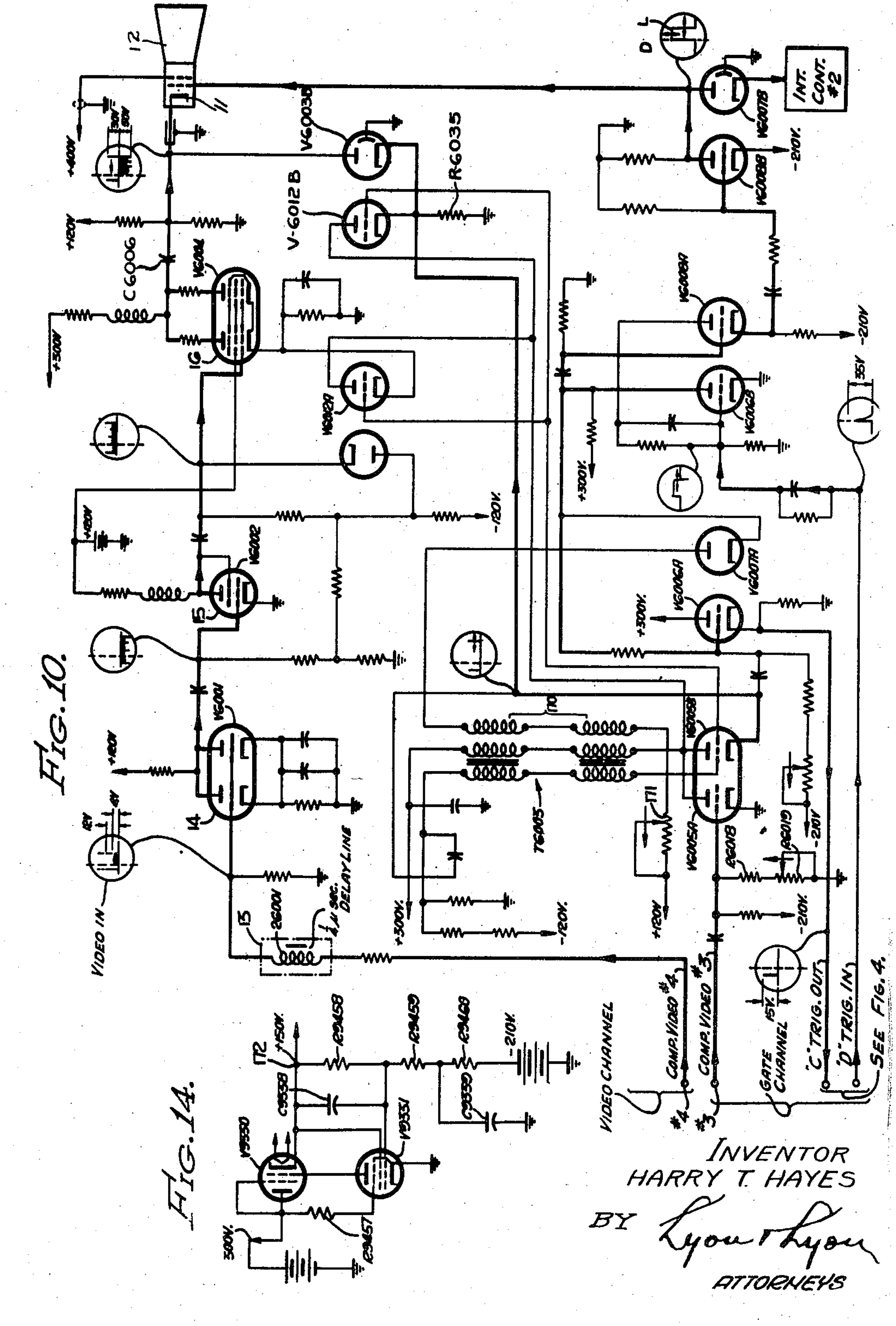
Figure 11:
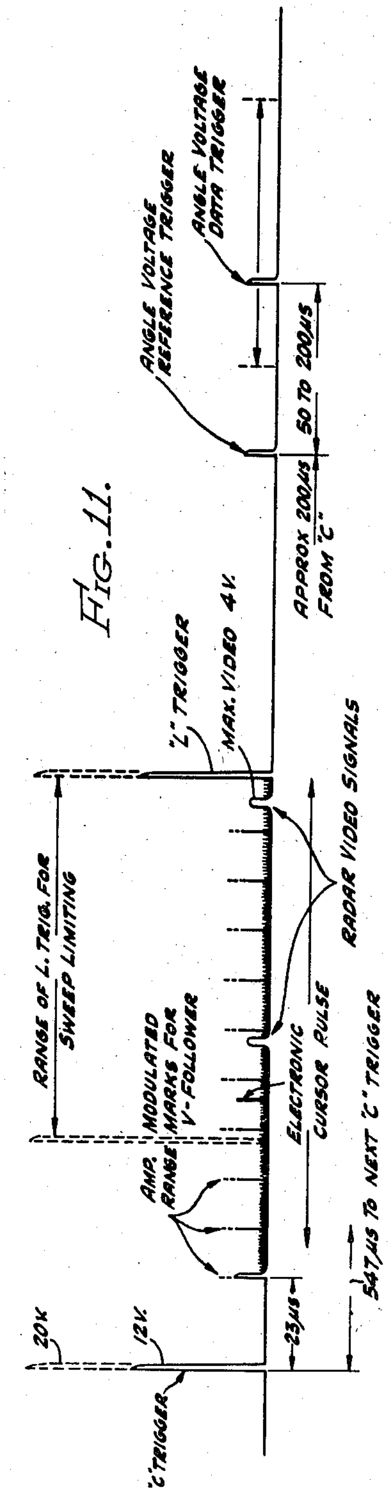
Figure 12:
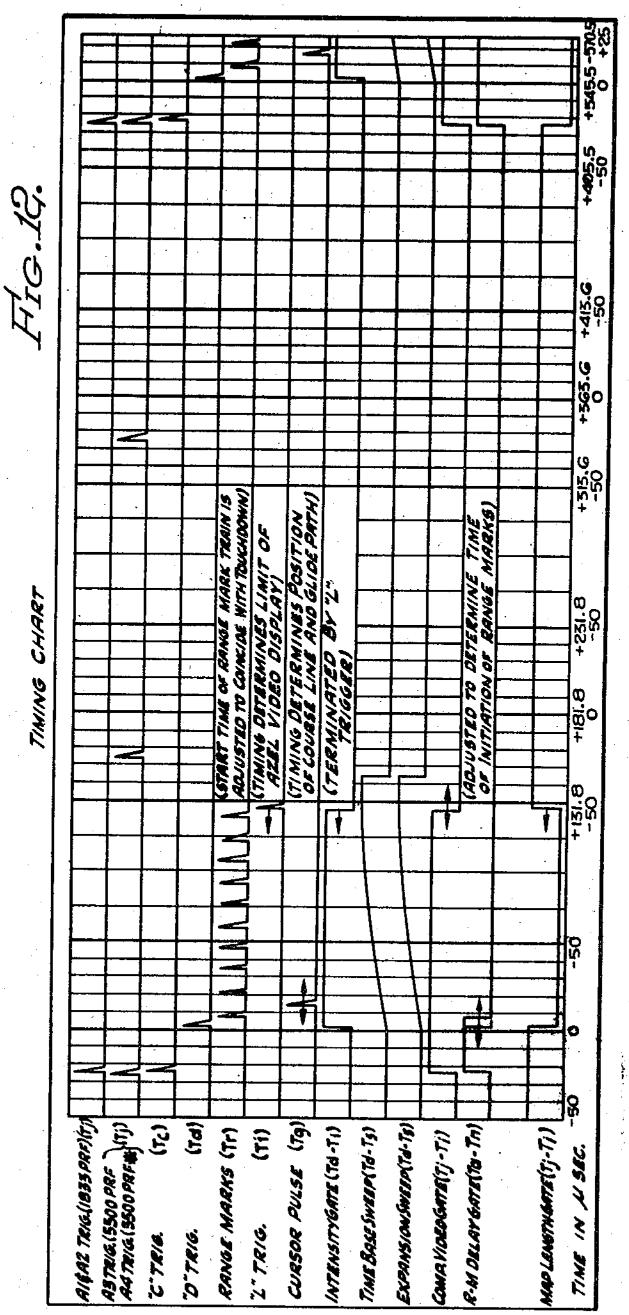

Figure 5 serves to represent the cyclical variation of azimuth and elevation beam angle scanning periods, operation of the relays and corresponding times in which the cathode ray tube is being used to develop either the elevation or azimuth display, as the case may be, on a time sharing basis;

Figure 6 shows the cyclical variation of azimuth and elevation beam angle voltages in relationship to the related position of the corresponding radiated azimuth and elevation antenna beams, such variation being preferably linear and being obtained in the corresponding beam angle coupling units shown in Figure 2 for use in developing V-follower information in accordance with features of the present invention;

Figure 7 shows in more simplified form apparatus indicated in block form in Figure 3;

Figure 8 shows in more detailed form the specific circuitry of elements indicated in block form in Figures 3 and 7;

Figure 9 shows a centering circuit for cyclically varying the origin of the radial sweeps, namely, the points $O_1$ and $O_2$ in Figure 1;

Figure 10 is a schematic representation showing in more detailed form some of the apparatus indicated in block form in Figure 4;

Figure 11 shows the time relationship between various triggers, range marks, cursor pulses and echo signals developed by the apparatus described herein;

Figure 12 shows in somewhat more detailed form the time relationship of other triggers, range marks, pulses, gates and sweeps generated by the apparatus shown in the previous figures, it being noted that such time relationships are shown on a logarithmic scale, and as shown are useful in providing logarithmic type of display of the character described and claimed in the copending patent application of Homer G. Tasker and Martin H. Shuler, Serial No. 175,168, filed July 21, 1950, now Patent No. 2,737,654, issued March 6, 1956, and assigned to the same assignee, although it is understood that otherwise the time relationships are such as to produce the linear type of display shown in Figure 1;

Figure 13 illustrates the sequential development of the azimuth and elevation unblanking voltages in relationship to the relay gating voltage as developed by the apparatus shown in Figure 2;

Figure 14 shows a voltage regulating circuit for compensating for load changes and serves essentially to maintain a voltage of 150 volts derived from a 300 volt source, the regulating circuit functioning to produce compensatory effects for load changes;

Figure 15 illustrates the time sequence of various voltages and the period of conduction of two tubes in the apparatus illustrated in the previous figures.

In general, the system described herein serves to produce visible indications in cathode ray tube displays which are shown in Figure 1. In Figure 1 it is observed that there are actually two displays, an upper elevation display and a lower azimuth display. Both of these displays are produced electronically using a single electron gun structure operating on a time sharing basis. The present invention relates particularly to the manner in which the composite video is applied to a cathode beam intensity control electrode, i. e., the control grid or the cathode, for purpose of obtaining visible indications in the displays.

This composite video includes, as shown in Figure 11: (1) The returning radar echo signals; (2) the range marks which are essentially aligned vertical lines in the azimuth and elevation displays; (3) intelligence in the form of amplitude modulation on the range marks for developing so-called V-follower lines in both azimuth and elevation displays, the V-follower lines in the azimuth display in Figure 1 serving to indicate the position in azimuth of the elevation antenna, and conversely the V-follower lines in the elevation display serving to indicate the position in elevation of the azimuth antenna; and (4) cursor pulses for producing electronically the predetermined safe glide path course line in the elevation display and the corresponding runway course line in the azimuth display. It is noted that this aforementioned train of information, i. e., composite video train, in the form of signals and pulses, is bracketed between so-called C and L triggers.

Briefly, as described in greater detail hereinafter, the C trigger is used to indicate the start of a gating voltage, and the L trigger terminates such gating voltage. Such gating voltage is applied to an intensity control electrode, i. e., the grid of the cathode tube, so as to condition or allow the cathode tube to produce visible indications in accordance with the various voltages which comprise the composite video. In other words, the components of the composite video are insufficient in themselves to produce visible indications on the cathode ray tube viewing surface, but require the presence of such gating voltage on the first anode of the cathode tube for producing visible indications.

It is observed that the composite video signals shown in Figure 11 do not, as such, include a designation of the V-follower voltages for producing the aforementioned V-follower lines, since such V-follower voltages are used in the present system to modulate, i. e., either to intensify or alternatively to de-intensify range marks.

It is evident that other periodically appearing voltages may be included in the composite video which is in the form of a train of signals having a length or time duration measured by the spacing between the C and L triggers, and therefore the present invention in its application is not limited specifically to voltages for producing the specific information described herein, but finds application in other systems wherein the composite video may include other intelligence denoting voltages or pulses. One of the important features of the present application is that such composite video train is applied and is effective to produce visible indications only during the duration of an established gating voltage. This gating voltage may be of constant duration for each cathode beam sweep, or may, as described herein, be of varying duration for purposes of obtaining tailored azimuth and elevation displays whereby most efficient use may be made of the cathode ray tube viewing surface.

While Figure 11 shows the composite video train in relationship to the C and L triggers, their relationship to other pulses or voltages in the complete radar system is shown in Figure 12. In Figure 12 the so-called A1 trigger is the system trigger and is the one generated in synchronizer 31 (Figure 2). The A1 trigger causes operation of the transmitter 34 and resulting antenna beam from the azimuth antenna or elevation antenna, as the case may be, depending upon the particular position of the radio frequency switch 36. The C trigger appears after the A1 trigger with a very small time delay. The C trigger is applied to the cathode beam sweep generating means for purposes of initiating a cathode beam sweep and serves to initiate the D trigger, as indicated in Figure 4. For remote control purposes, the amplitude of the C trigger is 12 volts when the azimuth displays is being produced, and is 20 volts when the elevation display is being produced.

While the series of range marks are initiated by the A1 trigger, they are adjustable along the time base axis as a unit, so that the first range mark occurs after the D trigger, and such first range mark corresponds to the aircraft touchdown point in either the azimuth or elevation display, as the case may be. The range mark generator for accomplishing such adjustability may be of the type described and claimed in the copending application of Pete Korelich, Serial No. 211,513, filed February 17, 1951, now Patent No. 2,698,401, issued December 28, 1954, and assigned to the same assignee as the present invention.

The L trigger is initiated by the C trigger but occurs with variable time delay after the C trigger, as indicated by the arrow on the L trigger in Figure 12, for purposes of limiting, clipping or tailoring the Az-El display. The L trigger is produced in the map generator (Figure 7), the circuitry and techniques involved in the same being shown and claimed in the copending application of Raymond B. Tasker, et al, Serial No. 222,512, filed April 23, 1951, and assigned to the same assignee as the present invention. As alluded to before, the L trigger determines when the intensity gating voltage applied to the control grid is stopped. The amplitude of the L trigger is the same as the amplitude of the C trigger during the azimuth and elevation presentations.

While for purposes of describing certain aspects of the present invention, the C and L triggers may have the same amplitude during the presentations of both the elevation and azimuth displays, they are shown as being modulated in amplitude to indicate the manner in which the present system described herein is adapted for the transmission of the video information to a remote location in accordance with an alternative arrangement described in my above mentioned Patent No. 2,796,603. When the present system is connected for remote operation, information as to the angular position of the radiated antenna beam is conveyed to such remote location in the form of a pair of triggers, i. e., a so-called reference trigger and a data trigger, and such reference and data triggers shown in Figure 11 are included herein for reference purposes and are utilized in the apparatus described in connection with the alternative arrangement shown in said Patent No. 2,796,603.

The apparatus for producing the composite video train of signals shown in Figure 11 includes means for generating the various intelligence denoting voltages and mixing the same so that they may be applied jointly between the C and L triggers to the cathode of the cathode ray tube. A portion of this apparatus is shown generally in block diagram in Figure 7.

In Figure 7 the composite video train appears in the so-called composite video line drivers which have four output terminals. Terminals labeled No. 1 and No. 2 are used for remoting purposes. The terminal No. 4, as shown in Figure 4, is coupled to the cathode 11 of the cathode ray tube 12 through a delay line 13 and amplifiers 14, 15, 16, while the output appearing on terminal No. 3 is applied to a network or gate channel indicated also in Figure 4 and shown in more detail in Figure 10 for separating the C and L triggers from the composite video train, and utilizing the same to form a gating voltage which is instituted by the C trigger and terminated by the L trigger, such gating voltage being applied to the grid 17 of the tube for purposes mentioned previously.

The range marks are produced in the range mark generator 18 in Figure 7, and are initiated by the A1 triggers, i. e., the radar system trigger. The output of the range mark generator 18, however, is modulated, i. e., either intensified or de-intensified, in accordance with voltages developed in the servo indication mixer and amplifier stage 19. Azimuth servo data and elevation servo data applied respectively to the elevation picture channel 20 and azimuth picture channel 21 are alternately supplied on a time sharing basis to such mixer and amplifier stage for producing the aforementioned modulation. Elevation and azimuth angle voltages are applied to the elevation and azimuth picture channels 20, 21, respectively, for developing the modulation component, so that such modulation component varies in accordance with the angular position of the radiated azimuth or elevation antenna beam, as the case may be, in the manner described later. The range marks thus modulated are applied to the range mark cursor and servo mixer 22, to which is applied cursor pulses developed in the map generator 23. It is noted that these cursor pulses are used to produce the glidepath and runway course lines.

The returning radar echo signals applied to the video amplifier 24 in Figure 7 are amplified therein and applied to the composite video mixer stage 25, together with the output from the range mark and servo mixer stage 22. It is observed that the video amplifier 24 is a gated one and is supplied for that purpose with positive gates 27 developed in the trigger mixer and composite video gate generator stage 28, the input to which includes the system A1 trigger and unblanking gate described later, as well as an L trigger from the map generator stage 23. The stage 28 serves to generate the C trigger, and the C and L triggers are applied to the C and L trigger generator stage 30, which is also supplied with either azimuth or elevation beam angle voltage, as the case may be, on a time sharing basis. The output of the C and L trigger generator stage 30 is applied to the composite video mixer 25, and the output of the composite video mixer is applied to the composite line driver stage 10.

More specifically, the apparatus described herein serves to produce the elevation display 32 and azimuth display 33 in Figure 1 with the predetermined safe glidepath represented by the line AB in the elevation display 32, produced electronically as a series of dashes, and to correspondingly produce electronically the runway line in the azimuth display 33 represented by the line CD. This is for the general purpose of allowing an observer to "track" the course of an aircraft appearing as the dots 38, 39 on the elevation and azimuth displays, respectively, with reference to such corresponding lines AB and CD.

It is noted that these displays 32, 33 are produced by radial cathode ray beam sweeps originating from the adjusted electrical centers $O_1$, $O_2$ of the cathode beam deflecting system. The series of vertically aligned lines 40, 41, 42, 43, 44 and 45 in both displays 32, 33 represent range lines, i. e., the locus of points of constant distance from the centers $O_1$ and $O_2$, as the case may be. The range line 40 passes through the aircraft touchdown point A on the elevation display, and of course through the small rectangular tab 46 which may be placed on the face of the cathode ray tube to indicate the position of the aircraft landing strip in the azimuth display. The line 40 in displays 32 and 33 thus represents zero distance from touchdown. The lines 41, 42, 43, 44 and 45 represent, respectively, distances two miles, four miles, six miles, eight miles and ten miles from the corresponding touchdown point in the azimuth and elevation displays 33, 32.

It will be observed that the elevation display 32 and azimuth display 33 are irregular in shape, and such irregularities in the displays are produced by pattern limiting or clipping so as to allow more efficient use of the viewing surface of the tube and to allow the most important portions of the displays 32, 33 to lie closer to each other. For purposes of reference, the elevation display comprises the area defined by $O_1$, F, G, H, J, K, $O_1$. Similarly, for purposes of reference, the azimuth display 33 is confined in the area defined by $O_2$, L, M, N, P, $O_2$. The pair of radially extending lines 50, 51 in the elevation display are well known so-called V-follower lines, and while they do not appear as such on either display, are defined by discontinuities in the range marks. Similarly, the pair of radially extending V-follower lines 52 and 53 in the azimuth display 33 indicates the area scanned by the elevation antenna, and are likewise defined by "obliterating" selected portions of the range marks, i. e., the range marks are "modulated" in accordance with the V-follower information to produce discontinuities in the range marks to thereby effectively define such V-follower lines.

The apparatus for producing the displays 32 and 33 is first described in connection with Figures 2, 3 and 4 which have correspondingly designated terminals interconnected to produce a system for producing the display shown in Figure 1 locally.

*Pattern producing means*

In Figure 2 the synchronizer 31 serves to generate timing pulses which are used to time the operation of pulses applied to the transmitter 34 to initiate its operation. The transmitter stage 34, pulsed at a constant repetition rate of, for example, 2,000 pulses per second, consists of, for example, a magnetron oscillator with a characteristic frequency of about 10,000 megacycles. The output of this transmitter stage 34 is transferred to either the elevation (El) antenna 54 of azimuth (Az) antenna 55, depending upon the position of the motor driven interrupter or radio frequency switch 36. The transmit-receive (T-R) switch 56 prevents power from the transmitter 34 from being applied directly to the receiver 57. This transmit-receive switch 35, as is well known in the art, allows low intensity signals such as a train of resulting echo signals received on the antennas 54, 55 to be transferred to the input terminals of the receiver 57.

This diversion of energy from the transmitter 34 to the antennas 54, 55, accomplished by operation of switch 36, occurs at a rate of approximately 2 per second, so that in effect the combined antennas obtain 4 "looks" per second of the space scanned. The resulting antenna beams are caused to move angularly, i. e., to scan upon rotation of the shaft 58. The switch 36 is rotated twice per second, and while energy is being transmitted to one of the antennas 54, 55, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, for "Bridge Type Precision Antenna Structure," now Patent No. 2,596,113, issued May 13, 1952, which depends for its operation on the use of a variable wave guide type of antenna. This particular means, per se, forms no part of the present invention and, so far as the aspects of the present invention are concerned, the antenna scanning beam may be produced by moving the entire antenna through a relatively small arc of a circle. Actually, in fact, the azimuth antenna beam may scan first in one direction and then in the other, waiting after each scan while the elevation beam completes a scan in elevation.

While in any position during the part of the cycle in which the R. F. switch 36 allows the flow of energy to the elevation antenna 54, the elevation antenna beam is electrically scanned in elevation. The angular position of the elevation antenna beam is measured by means of a variable capacitor 59 on plate of which is attached to the beam scanner of elevation antenna 54 and varied in accordance therewith, such capacitor 59 comprising one part of a capacitative potentiometer contained in the angle coupling unit 60, which may be of the type described and claimed in the copending patent application of George B. Crane, Serial No. 212,114, filed February 21, 1951, now Patent No. 2,650,358, issued August 25, 1953. The angle coupling unit 60 thus used with angle capacitor 59 is useful in developing the elevation beam angle voltage represented as 61 in Figure 6.

Similarly, the angle in azimuth of the azimuth antenna beam is measured by the angle capacitor 62 in azimuth angle coupling unit 63, operating synchronously with the scanner of the azimuth antenna 55. Such variation in azimuth angle voltage as a function of the particular angular position of the antenna beam is represented by the cyclically varying voltage 63 shown in Figure 6. It is observed that these voltage variations 61 and 63 have portions thereof shown in heavy lines, and it is these portions which are used to effect control operations, and which are selected by means mentioned later.

Figure 6 also shows, for purposes of reference, inverted useful elevation beam angle voltage as represented by the oblique lines 66.

Also coupled to the scanner of the elevation antenna 54 is the elevation unblanking switch 64, which has one of its terminals connected to the continuous voltage source 68, for purposes of developing an elevation unblanking voltage or gate so timed that its positive value corresponds to the time of effective scanning of the elevation antenna beam. The unblanking switch 65 is similarly coupled to the scanner of azimuth antenna 55, with one of its terminals connected to the continuous voltage source 68 for purposes of developing unblanking voltages so timed that the positive portions of such voltages correspond to the time of effective scanning of the azimuth antenna beam. Relay switch 69 operates at substantially the same time as switch 65, and synchronously therewith serves to generate the so-called Az-El relay voltage or gate (Figure 13) which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, as seen in Figure 13.

Figure 5 shows a schematic diagram of the time relations involved in a scanning cycle, which typically occupies a time in the order of one second. Forward progress of time is represented by clockwise motion about this diagram. The central circular region of Figure 5, marked N, shows the time schedule of the scanning operations of the two systems, opposite quadrants representing complete scans by the same system but carried out in opposite directions. The shaded areas (each comprising roughly 10° of the complete 360° cycle) represent the periods during which the transmitter 34 is switched by the switch 36 in Figure 2 from one antenna to the other. Unshaded areas of region N represent the time periods during which one or the other of the antennas is in use, sending out radio frequency pulses and receiving reflected echo signals from objects within the field of coverage of the beam. Shaded areas indicate inactive periods during which switching takes place, both antennas being momentarily isolated from the transmitter and receiver.

The inner annular region M of Figure 5 represents the time schedule of the related azimuth and elevation displays, subject, however, to pattern clipping described later, and corresponds to the cyclical variations of azimuth and elevation voltages represented in Figure 6.

The outer annular region of Figure 5, marked L, shows the time schedule of currents through the various coils of a number of so-called Az-El switching relays for effecting time sharing. The relay actuating current is obtained by the switch 69 (Figure 2) operating in synchronism with the mechanism producing azimuth antenna beam scanning.

More specifically, in Figure 2, the wave guide transmission line 70 leads from the transmitter 34 and receiving system 56, 57. A T-joint 71 divides this transmission line into two branches 73 and 74, leading through switch assembly 36 to the elevation and azimuth assemblies 54, 55, respectively. These branches have suitably placed shutter slots which receive the rotating shutters 75 and 76, respectively. These are mounted on the common drive shaft 58, driven by the motor 77, and have two blades each arranged in opposite fashion, so that when one antenna transmission branch is opened, the other will be blocked by its shutter. The shutter blades cover angles of approximately 100°, leaving openings of 80° as required by region N of Figure 5.

The same drive shaft 58 operates the two antenna beam scanning mechanisms, represented by the dotted lines 78, 79, and assumed to be of the construction in the above mentioned Allebach application and built into the antenna assemblies. In the showing of Figure 2 the eccentric cams 80, 81 on shaft 58 operate the beam scanning mechanim. Since each of the cams 80, 81 has one lobe, while its associated shutter 76 or 75 has two lobes, one opening in the shutter will find the antenna scanning in one direction, the other in the other direction. The azimuth and elevation blanking switches 65 and 64 are shown schematically in Figure 2 as cam actuated, being operated by the two-lobed cam 86, for purposes of establishing the unblanking or intensifying voltages represented in Figure 13.

The Az-El relay switch 69 is operated by the cam 87 on shaft 58 to control current to the circuit switching relays, the function of which is described hereinafter.

The radar echo signal, when received at the elevation antenna 54 or the azimuth antenna 55, is fed back through the R. F. switch 36 and passed through the tune-receive switch 56 into the receiver 57. Receiver 57 serves to detect the video, and after the video is amplified in the video amplifier stage 88 it is applied to the correspondingly designated terminal 88 in either Figure 3 or 7. Such video, i. e., radar video, derived from echo signals is mixed with other information in a composite video train, as mentioned previously in connection with Figure 11, and that portion of the video train between the C and L triggers is applied to the cathode 11 of the cathode ray tube 12 (Figure 4).

The cathode ray tube 12 in Figure 4 has a pair of magnetic deflection coils 90, 91, so arranged as to deflect the associated electron beam substantially parallel to two mutually perpendicular axes, the so-called "time base" axis which is generally, although not exactly, horizontal as viewed by the operator and as shown in Figure 1, and the so-called "expansion" axis which is generally vertical. In general, each basic A1 trigger pulse developed in synchronizer 31 (Figure 2) is made to initiate a current wave of sawtooth form through the time base deflection coil 90, and a current wave of similar form through the associated expansion deflection coil 91, the current in each coil expanding approximately linearly with time and then returning rapidly to zero. Instead of a linear variation, this variation may be logarithmic in character, as described in the above mentioned copending patent application of Homer G. Tasker et al., Serial No. 175,168, filed July 21, 1950 (now Patent No. 2,737,654), and assigned to the same assignee as the present application.

The repetition rate of such sawtooth currents is, of course, the same as the pulse repetition rate of the transmitted pulses, and occurs during the expectant period of resulting echo signals. It will be understood that electrostatic deflection of the cathode ray beam may be used instead of electromagnetic deflection, appropriate modifications being made in other parts of the equipment.

Such sawtooth currents applied to the deflection coils 90, 91, however, are "modulated" at a slow rate by currents of much lower periodicity which are produced by voltages, i. e., the beam angle voltages which are produced in accordance with the scanning movement of the antenna beam, and which are shown graphically in heavy lines in Figure 6. Those portions of the voltage indicated in heavy lines in Figure 6 only are used to modulate the sweep voltages on a time sharing basis.

These voltages, as represented by the curves 61 and 63, may vary from plus two volts at one extreme of the scanning range to plus fifty-two volts at the other end. These particular antenna beam angle voltages, as mentioned previously, are used in effect to "modulate" the amplitude of the sawtooth voltage waves developed in the sweep amplifier shown in Figure 4 and applied at a much higher repetition rate to the expansion coil 91, for purposes of obtaining unidirectional or unidimensional magnification in the cathode ray display in accordance with principles set forth in the copending patent application of Homer G. Tasker, Serial No. 680,604, filed July 1, 1946, now abandoned, and assigned to the same assignee as the present application. On the other hand, the amplitude of the sawtooth voltage waves developed in the sweep amplifier and applied to the other quadraturely acting time base coil 90 is likewise modulated to a much smaller degree and in a different manner, for purposes of orientation as described later.

Thus, the amplitude of the currents supplied to coil 91 is automatically varied in accordance with antenna beam angle voltage, so that the angle which any particular cathode ray beam makes, corresponds, on an expanded scale, to the antenna beam angle.

The tube 12 is rendered fully operative for producing visible indications only when a suitable intensifying voltage is applied to its grid 17, bringing the tube approximately to cut-off condition. A relatively small additional video signal applied to the cathode 11 then strengthens the cathode beam, making it momentarily visible on the screen as a dot, the position of which is determined by the currents flowing at that particular moment in the set of deflection coils 90, 91.

For purposes of developing the aforementioned suitable deflecting currents in the cathode ray deflection coils 90 and 91, the sweep generating circuit shown in Figure 4 is supplied with C triggers which appear in timed relationship and as a result of A1 triggers developed in synchronizer 31 (Figure 2). Such C triggers are applied in Figure 4 to the delay multivibrator and blocking oscillator stage 98, the output of which is fed to the sweep generating multivibrator stage 99. A negative gating voltage is generated in the stage 99 and fed to the expansion and time base modulator stages 100 and 101, respectively, and from them in modulated form through expansion and time base amplifiers 102 and 103. The output of amplifiers 102 and 103, in the form of essentially trapezoidal waves of appropriate amplitude, are applied to the expansion deflection coil 91 and the time base deflection coil 90, respectively, causing current pulses of linear sawtooth form in the coils. Expansion and time base centering circuits 105 and 106 are also connected to the deflection coils. The modulator stages 100 and 101, for purposes of modulation, receive Az-El antenna beam angle voltages via switches *m* and *n*, respectively, of relay K1101.

With the relay unactuated (as shown) the elevation beam angle voltage appearing on the potentiometer resistance 108 is applied through switch *m* to the expansion modulator 100; and through potentiometer resistance 109 and inverter 110 and switch *n* to the time base modulator 101. After completion of the elevation scan, relay K1101 is actuated by switch 69 (Figure 2) breaking the elevation beam angle voltage connections just described, and connecting the azimuth beam angle voltage through potentiometer 111 and switch *m* to the expansion modulator 100; and through potentiometer 112, inverter 113 and switch *n* to the time base modulator 101.

Thus, the degree of modulation of sweep current, and hence the degree of angle expansion of the display, may be separately regulated for the azimuth display by adjustment of the potentiometer 111, and for the elevation display by adjustment of potentiometer 108; and the degree of modulation of the time base sweep current, and hence the apparent angle between the range marks and the time base, may be separately regulated for the azimuth display by adjustment of potentiometer 112, and for the elevation display by adjustment of the potentiometer 109.

The centering circuits 105 and 106 in Figure 4 are individually capable of two separate adjustments, one effective when relay K1102 is actuated (azimuth display) and one when the relay is unactuated (elevation display) to determine the positions of the points $O_2$ and $O_1$, respectively in Figure 1. Thus, the origins of azimuth and elevation displays are separately adjustable, the centering circuits automatically responding to one or other set of adjustments according to the energized condition of relay K1102. A schematic diagram showing a centering circuit for this purpose is shown in Figure 9.

The deflection coil 91 in Figure 9 is connected between a 700-volt positive supply and two parallel circuits, one leading to ground through tube V1116, which is the final stage of expansion amplifier 102, and the other leading through choke coil L1101 and centering tube V1117 to a 1000-volt positive supply. The first of these two circuits feeds to deflection coil 91, the periodically varying sweep producing component, while the second circuit provides a relatively constant but adjustable centering current component. The cathode resistor of centering tube V1117 is made up of two paralled connected potentiometers R1158 and R1159, the movable contacts of which are connected respectively to the normally closed and normally open contacts of switch *m* of relay K1102. A switch arm is connected through grid resistor R1157 to the tube grid. The grid bias, and hence the centering current through the tube and through the coil 91 thus depends upon the position of relay switch *m* and is determined by the setting of potentiometer R1159 when relay K1102 is actuated (azimuth display) and by the setting of potentiometer R1158 when the relay is not actuated (elevation display). The two displays are therefore separately adjustable as their vertical position (expansion component) on the indicator tube by means of the two potentiometers.

Time base deflection coil 90 is provided with centering circuitry which is identical to that in Figure 9 and functions in a like manner, controlled by switch *n* of relay K1102. In fact, by appropriate changes of the numerals and lettering, Figure 9 may be considered to illustrate the time base centering circuit. The potentiometers then provide separate adjustments of the elevation and azimuth displays with respect to their horizontal positions (time base component).

Now that the apparatus for presenting the display has been described, a more detailed description of the apparatus and technique whereby the composite video train is produced and applied to the cathode of the cathode ray tube and whereby the patterns are clipped or tailored so that they assume the particular configuration shown in Figure 1 is now described in detail.

*Formation of composite video train*

The manner in which the composite video train is produced is alluded to above with reference to the previous description of Figure 7. For the following detailed explanation reference is made at this time not only to Figure 7 but also to Figures 3 and 8, as well as Figure 2 which discloses means for developing V-follower information, i. e., azimuth and elevation servo data. It is noted that Figure 3 is a block diagram, while Figure 8 shows the same apparatus as indicated in block diagram in Figure 3, and that the various tubes, delay lines and relays in Figures 3 and 8 have the same characteristic reference numerals; for example, the block in Figure 3 having the label V–9301A is applicable to the same designated tube in Figure 8. The range mark generator 18 serves to generate range marks in timed relationship with the A1 triggers applied thereto, and this range mark generator may be of the character described and claimed in the aforementioned copending application of Korelich.

The amplitude of the range marks is either increased or decreased, i. e., modulated, in accordance with the position of the servo modulation switch S–9301 in Figures 3 and 8. By this means discontinuities are produced in the range marks to thereby effectively establish the V-follower lines 50, 51, 52 and 53 (Figure 1) in the displays. These lines, of course, are not visible as such in the manner indicated in Figure 1, but such V-follower lines are shown in Figure 1 for more clearly illustrating certain operational features.

The V-follower information for modulating the range marks is developed in conventional manner, as for example, by the manner described and claimed in U. S. Letters Patent 2,483,644, Kelsey et al., patented October 4, 1949, a portion of which apparatus is shown in Figure 2. In Figure 2 the azimuth and elevation servo data is developed on the leads designated Az Servo Data No. 1, Az Servo Data No. 2, El Servo Data No. 1 and El Servo Data No. 2, such leads terminating at terminals 119, 118, 121 and 120, respectively.

Referring now to the schematic diagram in Figure 2, the V-follower voltages for use in the elevation display are obtained from two linearly wound rotary arm potentiometers 131, 132, whose arms are adjustably linked together as by the common shaft 137, and are linked to the antenna beam scanning mechanism as indicated schematically at 138, which controls the azimuth adjustment of the elevation antenna 54. The latter linkage, which may be of any suitable type, mechanical or otherwise, is indicated in Figure 2 by a dashed line 137A. Similar linkage between the elevation antenna 54 and the mechanism 138 is indicated by the dashed line 137B. The potentiometer strips 131 and 132 are connected in parallel as shown between a positive and a negative terminal of a voltage source and have the variable resistances 133, 134 and 135, 136 in series with them, by which the exact voltage range of each potentiometer may readily be controlled.

For each position of the azimuth adjustment of the elevation antenna, the V-follower voltages taken off the movable contacts of the potentiometer have definite values, the difference between them remaining constant. Each V-follower voltage determines directly the angle on the azimuth display of the corresponding V-follower data. Thus, the constant difference between the two V-follower voltages determines the fixed angle between the V-follower "lines" 50, 51 on the indicator tube in Figure 1. As the elevation antenna is rotated to vary its azimuthal position, the entire V rotates correspondingly as a unit about its vortex or origin $O_1$ on the screen. The angle between the V-follower "lines" 50, 51 and the relationship of each line to the azimuth angle of the elevation antenna may readily be adjusted, for example, by loosening set screws 131A and 132A, securing the potentiometer arms to shaft 137, rotating the arms through the required angle, and again tightening the set screws. Or the same adjustment may be accomplished by shifting the potentiometer tap to higher or lower potentials by manipulation of variable resistances 133, 134 and 135, 136. It is assumed, for the present description, that the arms are so adjusted that the take-off voltage of the potentiometer 131 is more positive than that of 132.

The V-follower voltages, obtained as just described, at the movable contacts of potentiometers 131 and 132 are compared by means of the circuitry in Figure 2, with the azimuth angle coupling voltage applied to the two tubes V–9306A and V–9306B (Figures 3 and 8). As the latter periodically becomes less positive during a given scanning cycle of the azimuth antenna, the relationship between the angle coupling voltage and first one and then the other of the V-follower voltages passes through a particular condition, as will be described, and causes generation of voltages which are used to modulate, i. e., either intensify or deintensify the range marks, as the case may be. More specifically, the two V-follower voltages are applied by leads 139A and 139B, respectively, to the grids of both sections of the cathode follower coupling tube V1, thus controlling the currents through these two sections and the voltage drops in their cathode resistors 140 and 141. Potentials of the two cathodes of tube V1 are thus determined and are used to control the circuitry shown in Figures 3 and 8.

While Figure 2 describes in detail only the arrangement for developing the elevation servo data, it is evident that the same apparatus may be duplicated and used for purposes of developing the azimuth servo data in the same manner. The azimuth servo actuator for that purpose has the reference numeral 143 (corresponding to servo actuator 138), and the corresponding azimuth servo data circuitry has the reference numeral 144 (corresponding to the circuit including potentiometer 131, 132).

The servo data modulation circuit shown in Figures 3 and 8 makes it possible to show the beam angle position of the azimuth antenna, in elevation, on the elevation portion of the display, and to show the beam angle position of the elevation antenna, in azimuth, on the azimuth portion of the display. This information is displayed by the intensification or deintensification (at the operator's option) of the range marks over the scanning area of the particular portion of the display sector affected. For this purpose, servo data No. 1 and No. 2, when properly adjusted, vary over the same voltage range as the angle voltage (50-volts) but are displaced in absolute value by a few volts when adjusted for proper display information (for example, 5–55 instead of 2–52). Voltage differences between the two leads No. 1 and No. 2, either azimuth or elevation, as the case may be, remain fixed as the corresponding antenna is servoed. Servo data No. 1 is adjusted to have a lower potential than servo data No. 2, and both values increase, as mentioned previously, as the servo angle of the antenna increases in a direction corresponding to the increase in angle voltage. For example, as the elevation antenna scans upwardly, elevation angle voltage from the elevation angle voltage generator increases; as the azimuth antenna is servoed upwardly, both azimuth servo data voltages increase.

The azimuth servo data lead No. 1 is coupled to the grid of tube V–9301A. This tube is the first half of a differential amplifier, and the current drawn by its cathode places the commonly coupled cathode of the second half of V–9302A at a level approximately two volts higher than the existing potential of servo data No. 1 lead. By this means V–9302A is held at the cut-off point until the value of the elevation angle voltage applied to its grid reaches a level close to the voltage present on the first grid (this level being the "cut-off" value for the tube) at which point the tube conducts. The elevation angle voltage increases in a positive direction as scanning action takes place from minus one degree upwardly, and decreases when the scanning direction is reversed; the limits of angle voltage amplitude are established to be plus two volts to plus fifty-two volts. The resultant wave form at the anode of tube V-9302A is a negative gate which starts at the instant the tube conducts (the two voltages, azimuth servo data voltage No. 1 and elevation angle voltage, are then approximately equal) and continues until the particular scan period is completed. The action of differential amplifier No. 2 is similar to that described for previously described amplifier No. 1. Servo data No. 2 applied to terminal 118 (Figure 8) is applied to the grid of tube V-9301B, causing the tube to conduct. The current drawn through the cathode of tube V-9301B places the commonly coupled cathode of tube V-9302B at a potential slightly higher than the servo data voltage. The action in this case is identical to the action described for differential amplifier No. 1 with the tube remaining below the point of conduction until the elevation antenna angle voltage applied to the grid of tube V–9302B approaches the cathode potential and forms a gate on the anode of tube V–9302B.

This gate is negative and, when scanning, is in a direction representing increasing angle voltage, and always occurs later than the negative gate from differential amplifier No. 1. When the antenna scans in the reverse direction the action is similar, but the order of appearance of the two gates is reversed. The output of differential amplifier No. 1 is applied to the first half of differential amplifier No. 3, tube V–9303A, which is normally conducting at saturation. The appearance of the negative gate lowers the common cathode potential to a point that allows normally non-conducting tube V-9303B to conduct, causing a negative gate to appear on its anode. This gate continues until the negative gate from tube V-9302B appears at the grid of tube V-9303B to again bias it below the point necessary for conduction. The level of the gate from tube V-9302B is clamped at approximately plus ten volts by action of a unidirectional conducting device such as the tube V-9332A. The resultant gate has a width determined by the potential difference between voltages on the azimuth servo data No. 1 and azimuth servo data No. 2 leads; the starting point is determined by the time at which the elevation angle voltage approximately equals the potential of the azimuth servo data No. 1 lead, and the terminating point is determined by the time at which the elevation angle voltage approximately equals the potential of the servo data No. 2 lead.

The elevation servo data leads No. 1 and No. 2 are connected in similar manner to the circuitry which includes the tubes V-9306A and B, V-9307A and B, V-9305A and B and V-9304B for accomplishing the same type of result in the azimuth display. Thus, gates are formed at the anode of tube V-9305A as a result of modulation of the azimuth antenna angle voltage by the elevation servo data appearing on elevation servo data leads No. 1 and No. 2. The outputs of the two circuits are paralleled by using the common load plate resistor R-9315 for the gating tubes V-9303B and V-9305A. This is possible due to the fact that the gates formed by the angle voltages and servo voltages from the different antennas do not overlap in time.

The combined output thus developed is applied to terminals of the "Servo Modulator Switch" S-9301, which, depending upon the position of the same, causes either an intensification or a deintensification of the range marks. In the deintensifying position of switch S-9301, the output of the switch is applied to the grid of the inverter tube V-9304A. The plate output of this tube is fed through the switch to the grid of the modulator tube V-9304B. The output from the anode of the modulator is a negative gate which is applied to the grid of mixer tube V-9313A. In the intensifying position of switch S-9301, the inverter tube V-9304A is shunted out of the circuit and the modulating gates are applied directly to the grid of modulator tube V-9304B, its plate output then in such case being positive and applied in similar manner to the control grid of tube V-9313A.

It is thus observed that the range marks developed in range mark generator 18 and applied through the amplitude controlling potentiometer 146 and condenser 147 are mixed on the grid of tube V-9313A with the aforementioned V-follower information in either an additive or a subtractive manner. The voltage thus developed on the cathode of the mixer tube V-9313A is a measure of both the intensity of the range marks and the intensity of the V-follower information, and is applied from the cathode of tube V-9313A through coupling condenser 148 to the control grid of the mixer tubes V-9319A, B.

The map generator 23 (Figure 7) is identical with that one shown and claimed in the copending patent application of Green et al., Serial No. 222,511, filed April 23, 1951, and assigned to the same assignee, and serves to develop two types of pulses, namely, cursor pulses and L triggers. The cursor pulses are used in such pending application and herein to produce electronically and visually the predetermined safe glidepath 149 (Figure 1) in the elevation display and the runway course line 150 in the azimuth display. The line 149 corresponds to the line AB, and the line 150 corresponds to the line CD. The L trigger is used in such copending application and herein for display limiting or tailoring, as well as for other purposes herein. While the output from the map generator 23 comprises cursor pulses and L triggers, the input to the map generator comprises, on the one hand, the relatively slow varying azimuth-elevation angle voltage and, on the other hand, the A1 system trigger. These cursor pulses developed in the map generator are applied to the mixer stage 22 in Figure 7, details of which are more clearly illustrated in Figures 3 and 8.

Cursor pulses from the map generator 23 in Figure 3 are delivered to the grid of the cathode follower tube V-9314A, the cathode of which is in parallel with the cathode of mixer tube V-9313A. The output from both of these cathodes is sent to the range mark mixer tubes V-9319A and V-9319B.

The output of the mixer stage 22 (Figure 7) is applied to the composite video mixer 25, to which is likewise applied the radar video output from the video amplifier 24. The video amplifier stage 24 is now described in detail.

With reference to the following description of the video amplifier, it should be noted that the video amplifier 24 is effective as a passive network only during the duration of the video gate 27 (Figure 7) developed in and applied to the video amplifier from the video gate generator stage 28.

The radar video, in the form of echo signals, is applied to the amplitude controlling potentiometer R-9394. The video is applied from such potentiometer R-9394 to the control grid of gating amplifier V-9315. The suppressor grid of this tube is normally biased below the cut-off point of the tube by voltage from the voltage divider circuit which comprises in part resistances 151, 152. A gate is received from the flip-flop circuit comprising tubes V-9329A and V-9329B. The start of this gate, a video sampling gate, is coincident with the A1 trigger, and its trailing edge occurs approximately one-quarter of a microsecond after the arival of the L trigger developed in the map generator. Crystal 154 establishes the level of the suppressor grid of tube V-9315 and the control grid of tube V-9316A at ground potential for the duration of this gate.

All video appearing on the grid of tube V-9315 is amplified and reproduced in the anode circuit during the time the video sampling gate 27 is present. During the gate interval the anode voltage of tube V-9315 drops, due to the higher current flowing at that time through the tube. This voltage drop is cancelled by the action of the pedestal canceller tubes V-9316A and V-9316B, which apply a positive gate of opposite polarity and of the same amplitude to the output. The pedestal canceller circuit, including tubes V-9316A, B, serves to establish a predetermined voltage level during the duration of the video sampling gate. The tube V-9317 amplifies the video signal and applies the same to the grids of the paralleled video mixer tubes V-9318A and V-9318B, which reproduce the video in their common cathode circuit. Crystals 155 and 156 serve as D. C. restorers. The manner in which the video sampling gate 27 is obtained is described in detail hereinafter, it being sufficient for the present purposes to note that a sampled portion of the radar video only has its effect on the control grids of tubes V-9318A, B, which have their cathodes connected to the cathodes of similar mixing tubes V-9319A, B.

The other tubes V-9320A, B, having their cathodes connected to the cathodes of the aforementioned tubes V-9318A, B and V-9319A, B, serve as a mixer for the C and L triggers. Thus, range mark pulses, modulated servo data, i. e., V-follower information, from the cathode mixer tube V-9313A and mixed with cursor pulses from the cathode of tube V-9314A are applied to the paralleled grids of range mark mixer tubes V-9319A, B. These grids are maintained at a cut-off level until the appearance of a positive gate from the anode of gating tube V-9314B, which is essentially the video sampling gate described above for purposes of changing the bias on the suppressor grid of tube V-9315. The range mark mixer stage operates only for the duration of this gate. C and L triggers from the switches of relay K-9302 are applied to the control grids of tubes V–9320A, B. The winding of relay K–9302 is energized only during the azimuth scanning period, the relay gate developed by the switch 69 shown in Figure 2 being used for that purpose.

In other words, as will be more evident later, the C and L triggers, comprising a pair of triggers, have a certain amplitude during the time the elevation display is being developed, and such pair of triggers is caused to have a different amplitude during the time the azimuth display is being developed, all for the purpose of developing relay gates, in the manner set forth hereinafter. When the apparatus is intended to produce a display in proximity to the radar apparatus, the pairs of C and L triggers during both the azimuth and elevation scanning periods may have the same amplitude instead of different amplitudes as described herein. Thus, the composite video train now comprising the C trigger, the radar video, range marks modulated in amplitude in accordance with V-follower information, cursor pulses and L triggers, is applied to four separate cathode follower stages which include tubes V–9321A and B, V–9322A and B, V–9323A and B, and V–9324A and B. These four tubes have been mentioned previously, and serve in general to feed the composite video train to the precision video amplifiers and to the precision remote line driver. Each video output is terminated with a 22-ohm resistance for protection in case the external 100-ohm terminations are disconnected.

As mentioned previously, the video amplifier 24 is operative only during the duration of the gate 27. The manner in which this video gate 27 is developed and applied to the video amplifier 24 is now described in detail. The video gate 27 is formed in the stage 28, to which is applied the A1 trigger. The stage 28, as shown in Figures 3 and 8, includes a coincidence tube V–9326, to the grid of which is applied the A1 system trigger. The grid of this tube, in its quiescent state, is biased below cut-off and is driven above cut-off by the system trigger. A negative potential applied to the suppressor grid of tube V–9326 maintains the tube below cut-off until the arrival of the unblanking gates developed by operation of the antenna blanking switches 64 and 65 (Figure 2). The tube V–9326 thus conducts only when the A1 trigger for the unblanking gate is simultaneously present on the control grid and suppressor grid of the tube V–9326. Thus, A1 triggers appear in the anode circuit of tube V–9326 only during the periods of the unblanking gates, and are applied therefrom to the flip-flop circuit comprising tubes V–9329A, B.

The negative A1 trigger causes tube V–9329B to cut off, and a resulting rise in its anode voltage is transferred through condenser 160 to the grid of tube V–9329A, which then starts to conduct. Tube V–9329A continues to conduct while tube V–9329B continues in its cut-off condition until the arrival of a negative trigger on its control grid, i. e., negative L trigger. The L trigger developed in the aforementioned map generator, delayed for approximately one-quarter of a microsecond in delay line Z–9302, is applied to the control grid of tube V–9328B which, in its quiescent state, is normally cut off. This L trigger thus delayed appears as a negative trigger on the anode of tube V–9328B from where it is applied to the control grid of tube V–9329B. The video sampling gate 27 thus created is applied to the gating amplifier V–9315 to gate the incoming video and also to the control grid of gating tube V–9314B, for range mark mixing gating, and also to coincidence tube V–9327 for a C and L trigger gating. The gate starts earlier than the C trigger and terminates later than the L trigger in order to include both triggers within its duration.

It is noted that whereas the gate 27 applied to the suppressor grid of tube V–9315 is a positive gate, a gating voltage 27A of the same duration developed on the cathode of tube V–9329B is applied to the control grid of tube V–9314B. The action and purpose for applying such gating voltage to the tube V–9327 will be more evident from the following description.

In order to encompass both the C and L triggers on the composite video train, as alluded to previously, the tubes V–9327 and V–9325A and B serve a useful purpose. The A1 system trigger is applied through delay line Z–9301 to the control grid of tube V–9325A. This delay line imparts a three-quarters of a microsecond delay to the system trigger, and it is observed that the tube V–9325A is a cathode follower mixer tube normally maintained in its quiescent state at cut-off. The delayed A1 trigger thus appearing on the cathode of tube V–9325A is termed the C trigger and occurs at time $T_c$ (Figure 12). The L trigger is applied to the control grid of tube V–9325B which also, in its quiescent state, is maintained at cut-off. The L trigger appears on the common cathode of tubes V–9325A and B at some variable $T_1$ (Figure 12) after the appearance of the C trigger.

The precise time $T_1$ is determined by the circuitry in the map generator, and in general is a function of the azimuth or elevation antenna beam angle voltage in accordance with the principles and techniques described and shown in the aforementioned patent application of Green et al., Serial No. 222,511. Both the C and L triggers appearing on these common cathodes are applied to the control grid of the coincidence tube V–9327 which, in its quiescent state, is grid biased below cut-off. The suppressor grid of tube V–9327 is also normally biased at a voltage below the plate current cut-off level of the tube. Upon the arrival of the video sampling gate to the suppressor grid of tube V–9327, the suppressor grid is released from its cut-off bias and the tube is enabled to conduct for the duration of each C and L trigger applied to the control grid of tube V–9327.

These triggers reproduced at the anode of tube V–9327 are impressed on the primary winding of blocking oscillator transformer T–9303. Blocking oscillator tube V–9328A has applied to its grid the C and L triggers from the secondary winding of transformer T–9303, and reproduces the triggers on its cathode. The grid of tube V–9328A, in its quiescent state, is biased below the cut-off point, and this tube conducts only upon the application of the C and L triggers. The C and L triggers appearing on the cathode of tube V–9328A are applied to two parallel connected potentiometers 165, 166. It is observed that the movable taps of these potentiometers 165, 166 are connected to opposite stationary terminals of the single pole double throw switch of relay K–9302, so that during the elevation scanning period the amplitude of the C and L triggers applied to the control grid of tube V–9320B is determined by the setting of the tap on potentiometer 165; and conversely, the amplitude of the C and L triggers during the azimuth scanning period is determined by the setting of the tap on potentiometer 166. These controls 165, 166 are adjusted so that the C and L triggers each have an amplitude of 12-volts during the azimuth scanning period, and each have an amplitude of 20-volts during the elevation scanning period.

To further complete the description of Figures 3 and 8, and to describe the manner in which the Az-El antenna beam angle voltage is transferred over a single conductor, reference is had to the relay control tube V–9308 and relay K–9301. The relay gate shown in Figure 2 as being developed by operation of the switch 69 is applied to the control grid of tube V–9308. This voltage is in the order of 28 volts and serves to cause the tube V–9308, normally non-conducting, to conduct and to energize the winding of relay K–9301.

It is noted that this relay gate brackets the azimuth antenna scanning period. Energization of relay K–9301 causes azimuth angle voltage to appear on the Az–El angle voltage lead 170 for use by other components of the system. It is noted that the lead 170 thus carries both the azimuth and elevation beam angle voltages which appear alternately. During periods of elevation antenna scan, the blanker switch relay gate is absent, relay K–9301 is deenergized, and the elevation angle voltage appears on the lead 170. By this expedient a single line serves to carry the output of both angle voltage generators alternately and in synchronism with scanning periods of the antenna. The winding of relay K–9302 may be serially connected with the relay winding K–9301, so that it may be energized in a like manner to give, as mentioned previously, the C and L triggers an amplitude of 12-volts during the azimuth scanning period and 20-volts during periods of elevation scanning.

Also considered of importance in this present arrangement is the 150-volt regulated power supply shown in Figure 14. In Figure 14 a regulated voltage of 150-volts is obtained using a series regulator tube V–9330 and control tube V–9331. A 300-volt voltage source has its ungrounded positive terminal connected to the anode of tube V–9330 and to the anode of tube V–9331 through the series resistance R–9457. The plate-cathode voltage drop of tube V–9330 establishes a positive voltage of 150-volts on the cathode of tube V–9330 through the voltage divider and amplifier circuit comprising tube V–9331 and resistor R–9458, R–9459 and R–9460, which are connected to the ungrounded negative terminal of the 210-volt source. Any load changes causing voltage variations on the 150-volt output terminal 172 creates an opposing conductance condition in amplifier tube V–9331 which, in turn, varies the conductance level of tube V–9330, thereby compensating for the load change.

*Means and techniques for applying composite video train bracketed by C and L triggers to cathode 11 of tube 12*

From the foregoing description the means and techniques whereby that portion of the composite video train shown in Figure 11, which includes only the C and L triggers, and that portion of the video bracketed by the C and L triggers, are described above. It is only the specifically mentioned portion of the video train that is required for producing the cathode ray tube displays at a local station, and in that respect the C and L triggers either may be different amplitudes or the same amplitude during the azimuth and elevation scanning periods.

The following description, in relationship to Figures 4 and 10, serves to fully describe the manner in which, first, the video bracketed by the C and L triggers is applied as a negative going signal to the cathode 11 of the cathode ray tube 12, and, second, the manner in which the gate channel connected to terminal No. 3 develops a positive going gating voltage for application to the control grid 17 of tube 12, the boundaries of such gating voltage being determined by the C and L triggers, respectively. It is observed that the video channel connected to terminal No. 4, which includes the delay line 13 and amplifiers 15 and 16, is alluded to above.

The video amplifying channel in general is conventional, but of importance is the manner in which the final amplifier stage 16 is controlled in accordance with certain triggers for purposes of preventing "blooming" at the extremities of the cathode ray tube display. Such triggering voltage is transferred to the amplifier stage 16 through tube V–6012A, which has its cathode connected to the cathode of tube 16 as shown in Figure 10. The manner in which the tube 16 is thus controlled by variations of potential on a cathode of tube V–6012A will be more clear from the following description of the gate channel which includes terminal No. 3. In general this gate channel, including terminal No. 3, the blocking oscillator tube V–6005A, B, diode V–6007A, cathode follower V–6006A, multivibrator stage including tubes V–6006B and V–6008A, shaper and inverter tube V–6008B, level control tube V–6007B and tube V–60012A. This gate channel selects information from the composite video train to form the intensity gate and serves also to gate off the video channel, i. e., the video amplifier tube 16 and triggers above certain specified amplitude.

The operation of this gate channel composite video train is applied to the control grid of the first blocking oscillator tube V–6005A, which serves as the trigger tube. Resistance R–6018, which is serially connected with resistance R–6019, serves to determine the intensity at which the blocking oscillator tube V–6005A is triggered and this resistance is adjusted so that the blocking oscillator stage is fired by all C and L triggers, but does not fire on any video signals. It is noted in this respect that the C and L triggers are always of much greater amplitude than the video signals bracketed by such C and L triggers.

It is desired to separate the C and L triggers and this is accomplished as follows: consider the fact that any trigger which passes through the gated cathode follower tube V–6006A is delayed approximately 22 microseconds by the circuitry in the sweep amplifier and is returned as a D trigger. The manner in which the C trigger is delayed in time to form the D trigger is indicated in Figure 4 wherein the delay multivibrator 98 serves to impart such delay. The D trigger is applied to the multivibrator stage comprising tubes V–6006B and V–6008A. The D trigger initiates operation of this multivibrator stage V–6006B, V–6008A, which, in turn, gates off the cathode follower tube V–6006A. Thus, while initially the C trigger causes the gated cathode follower stage V–6006A to become conductive, the subsequently developed D trigger serves to return the cathode follower stage V–6006A to its normally non-conducting condition and any subsequent trigger then is not passed through the cathode follower stage V–6006A until after the multivibrator stage V–6006B and V–6008A is returned to its normal condition.

After the last mentioned multivibrator state is started, it may be stopped by any subsequent trigger on the composite video train, i. e., by the L trigger. This is accomplished by applying the blocking oscillator pulse developed in the winding 170 of the blocking oscillator transformer T–6003 through diode V–6007A to the anode of tube V–6006B. The intensity of this pulse for accomplishing this purpose may be adjusted by the so-called gated stop adjusting resistance 171, which is serially connected with winding 170.

Recapitulating, the C trigger causes the block oscillator stage V–6005A, B to fire. The resulting signal passes through cathode follower V–6006A and is delayed approximately 22 microseconds by the delay in multivibrators 98 (Figure 4) to form the so-called D trigger. Multivibrator stage V–6006B, V–6008A is started by this D trigger which, in turn, shuts off the cathode follower tube V–6006A. The L trigger, which follows the C trigger on the composite video train a variable time in the order of 30 to 140 microseconds, causes the blocked oscillator stage V–6005A, B to fire. The blocked oscillator signal resulting from this L trigger, fed to the anode of tube V–6006B, causes the multivibrator stage V–6006B, V–6008A to return to its normal position. A negative gate as a result is available at the cathode of tube V–6008A, which is the same length as the spacing between the D and L triggers. After this negative gate is shaped and inverted by stage V–6008A, it is coupled to the grid of the cathode ray tube as an intensifying gate. The intensity level of this gate is set by adjusting the clipping level of tube V–6007B by the time base intensity control. Since the same trigger which stops the intensity gate, i. e., the L trigger, appears in the video channel at several times normal video amplitude, it is desired that some precaution be taken to prevent "blooming" at the outline of the different azimuth and elevation displays. This is accomplished by applying the blocking oscillator pulse appearing on the cathode of tube V–6012A to the cathode of the video output tube V–6004 of stage 16.

It is noted, as previously described, that the composite video train in the video channel is delayed by the delay line 13 a time in the order of ¼ microsecond to thereby allow time for the blocking oscillator V–6005A, V–6005B to fire and cut off tube V–6004 during the C and L trigger times. In this respect it is noted that the control grid of tube V–6012A is connected to the control grid of the blocking oscillator tube V–6005B.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described, a range mark generator for developing range marks, means for deriving voltages representative of the limits of scanning movement of a radiated antenna beam, means modulating said range marks in accordance with said voltages, means for deriving cursor pulses useful in establishing electronically a predetermined glide path, means for deriving pulses in timed relationship with the transmission of energy by said antenna beam, gated mixing means controlled by said pulses for mixing said modulated range marks with said cursor pulses, means for deriving radar video, gated mixing means controlled by said pulses for mixing said radar video with said modulated range marks and cursor pulses, means deriving a pair of time spaced control triggers from each one of the aforementioned pulses, and means mixing said time spaced control triggers with said radar video, modulated range marks and cursor pulses so as to bracket the same.

2. The arrangement set forth in claim 1 in which a utilization device is provided, means deriving a gating voltage having a time duration commensurate with the spacing of said control pulses, and means rendering said utilization device effective to said video modulated range marks and cursor pulses only for the time duration of said gating voltage.

3. The arrangement set forth in claim 1 in which a pair of antennas are effective alternately to produce said radiated antenna beam, and means for changing the amplitude of said control triggers in a degree dependent upon which one of said pair of antennas is scanning so that the amplitude of said control pulses serves as an indication as to which of the two antennas is effective at that particular time.

4. In a system of the character described, means for developing pulses in timed relationship with the transmission of radiated energy in the form of an antenna beam; means for shifting the angular position of said antenna beam, means for deriving radar video signals from said radiated energy, cathode ray tube indicating means including means for periodically developing cathode beam sweeps in time relation with said pulses and means for shifting the position of said cathode beam sweeps in accordance with the angular position of the radiated antenna beam, means deriving a first control trigger voltage occurring at variable times after said pulse depending upon the angular position of the radiated antenna beam, a video channel coupling said video to an intensity control electrode of said cathode ray tube, said channel being normally ineffective in its quiescent state, to transfer video to said electrode, gate generating means for controlling the effectiveness of said channel, said gating means including means for developing a gating voltage which starts substantially contemporaneously with said pulse and terminates a relatively short time interval after said control trigger voltage, means incorporating delay means for developing a second control trigger voltage which occurs an appreciable time after said pulse, a mixer stage for mixing said first and second trigger voltages, a channel coupling said trigger voltage mixing means to said video channel, said coupling means being normally effective to transfer said first and second trigger voltages to said video channel, and means rendering said coupling means effective in accordance with gating voltages applied thereto which starts prior to said second trigger voltage and ends after said first trigger voltage.

5. In a system of the character described, a source of pulses for initiating radiated pulses and for receiving returning radar video signals, a video channel normally ineffective to pass said video signals, but rendered effective upon application of a gating voltage thereto, said gating voltage starting substantially contemporaneously with each of said pulses and terminating after the expectant period of returning echo signals, and means deriving from each of said pulses a pair of control trigger voltages, means normally ineffective to couple said control trigger voltages to said video channel for transmission therethrough, and means rendering said coupling means effective upon application of said gating voltage thereto.

6. In a system of the character described, a source of pulses for producing radiated energy and resulting radar video echo signals, a video channel to which said video signals are applied, said video channel being normally ineffective to pass said video signals, means deriving from each of said pulses a pair of time spaced control trigger voltages, the first of such trigger voltages occurring an appreciable time after a corresponding pulse and the other of said trigger voltages occurring at the termination of the expectant period of returning echo signals, means for developing a gating voltage having a time duration which starts substantially contemporaneously with each of said pulses and which ends an appreciable time after said second control trigger voltage, said video channel being controlled in accordance with said gating voltage to render said video channel effective, means coupling said control trigger voltages to said video channel for transmission therethrough, said coupling means being normally ineffective but incorporating means whereby the same is rendered effective upon application thereto of said gating voltage.

7. In an arrangement of the character described, a source of triggering pulses, a source of video signals produced in sequence in timed relationship with said triggering pulses, a source of map limiting trigger voltages, means deriving from said triggering pulses and map limiting trigger voltages a gating voltage which has a time duration which begins substantially contemporaneously with said triggering pulses and which ends an appreciable time interval after said map limiting trigger voltage, a video channel coupled to said source of video signals but normally ineffective to pass said video signals, means applying said gating voltage to said video channel to render the same effective, means deriving from said triggering pulse a first trigger voltage which is delayed with respect to said triggering pulse, a mixer stage for combining said first and map limiting trigger voltages, a first and map limiting trigger voltage channel coupled to said mixer stage but normally ineffective to pass said first and map limiting trigger voltages, means applying said gating voltage to said first and second trigger voltage channel to render the same effective, and means coupling said first and map limiting trigger voltage channel to said video channel.

8. In an arrangement of the character described, a source of triggering pulses, a source of video signals, a source of map limiting triggers, means coupled to said source of triggering pulses for producing corresponding first delayed trigger voltages, a mixer stage for mixing said delayed and map limiting trigger voltages, means coupled to said source of map limiting trigger voltages for developing a delayed map limiting trigger voltage, means for deriving from said triggering pulses and delayed map limiting trigger voltages a gating voltage which starts substantially contemporaneously with said triggering pulses and which terminate substantially contemporaneously with said delayed map limiting trigger, a first delayed and map limiting trigger voltage channel coupled to said mixer stage but normally ineffective to transfer the mixed first delayed and map limiting trigger voltages, means applying said gating voltage to said first delayed and map limiting trigger voltage channel for rendering the same effective, a video channel coupled to said source of video signals but normally ineffective to pass said signals, means applying said gating voltage to said video channel to render the same effective, a range mark generator, a channel coupled to said range mark generator but normally ineffective to pass range mark signals, means coupling said gating voltage to said range mark channel to render the same effective and mixing means coupled to said video channel, first delayed and map limiting trigger voltage channel and range mark channel for producing a composite video output which includes the first delayed and map limiting trigger voltages, range marks, and video signals.

9. In an arrangement of the character described, a video channel, normally ineffective to pass video signals, means for developing a pair of time-spaced trigger voltages which bracket said video signals, a trigger voltage channel normally ineffective to pass said time-spaced trigger voltages, means deriving a gating voltage which starts an appreciable time interval before the first one of said time-spaced trigger voltages and which terminates a substantial time after the last one of said time-spaced trigger voltages, and means in each of said video and trigger voltage channels for rendering said channels effective upon application of said gating voltage thereto, and a mixer stage coupled to said video channel and trigger voltage channels for developing a composite video train which includes said time-spaced trigger voltages and video signals bracketed by said time-spaced trigger voltages.

10. The arrangement set forth in claim 9 including a range mark generator, a range mark channel coupled to said range mark generator but normally ineffective to pass range marks, said range mark channel incorporating means for rendering the same effective upon application of said gating voltage thereto, and means mixing the output of said range mark generator with the output of said video channel and with the output of said trigger voltage channel.

11. In an arrangement of the character described, a video channel normally ineffective to pass video signals, means for developing a pair of time-spaced trigger voltages which bracket said video signals, a trigger voltage channel normally ineffective to pass said time spaced trigger voltages, means deriving a gating voltage which starts an appreciable time interval before the first one of said time-spaced trigger voltages and which terminates a substantial time after the last one of said time spaced trigger voltages, means in each of said video and trigger voltage channels for rendering said channels effective upon application of said gating voltage thereto, a mixer stage coupled to said video channel and trigger voltage channel for developing a composite video train which includes said time spaced trigger voltages and video signals bracketed by said time spaced trigger voltages, a range mark generator, a range mark channel coupled to said range mark generator but normally ineffective to pass range marks, said range mark channel incorporating means for rendering the same effective upon application of said gating voltage thereto, means mixing the output of said range mark generator with the output of said video channel and with the output of said trigger voltage channel, and means for modulating the intensity of the range marks generated by said range mark generator by voltages representing the limits of scan of an antenna causing said video signals.

References Cited in the file of this patent

UNITED STATES PATENTS

| | | |
|---|---|---|
| 2,483,644 | Kelsey et al. | Oct. 4, 1949 |
| 2,513,962 | Patterson | July 4, 1950 |
| 2,585,855 | Sherwin et al. | Feb. 12, 1952 |